(12) United States Patent
Dempsey et al.

(10) Patent No.: US 9,109,521 B2
(45) Date of Patent: Aug. 18, 2015

(54) ENGINE SPEED CONTROL

(71) Applicant: CUMMINS IP, INC., Minneapolis, MN (US)

(72) Inventors: Daniel R. Dempsey, Greenwood, IN (US); Jonathan A. Dickson, Columbus, IN (US); Craig M. Calmer, Columbus, IN (US)

(73) Assignee: Cummins IP, Inc., Minneapolis, MN (US)

( * ) Notice: Subject to any disclaimer, the term of this patent is extended or adjusted under 35 U.S.C. 154(b) by 386 days.

(21) Appl. No.: 13/748,025

(22) Filed: Jan. 23, 2013

(65) Prior Publication Data
US 2014/0202421 A1    Jul. 24, 2014

(51) Int. Cl.
*F02D 41/02* (2006.01)
*F02D 41/00* (2006.01)
*F02D 31/00* (2006.01)

(52) U.S. Cl.
CPC .......... *F02D 41/0005* (2013.01); *F02D 31/009* (2013.01); *F02D 41/022* (2013.01); *F02D 41/0205* (2013.01); *F02D 41/0225* (2013.01); *Y02T 10/42* (2013.01)

(58) Field of Classification Search
CPC .............. F02D 41/022; F02D 41/0205; F02D 41/0225; F02D 31/009
USPC ................ 123/350, 436; 701/110, 51, 61, 62; 477/77, 79, 80, 83, 84, 90, 91, 107, 477/115
See application file for complete search history.

(56) References Cited

U.S. PATENT DOCUMENTS

| | | | |
|---|---|---|---|
| 4,468,987 A | 9/1984 | Miller | |
| 5,706,199 A * | 1/1998 | Wilson et al. | 701/93 |
| 6,188,946 B1 * | 2/2001 | Suzuki et al. | 701/62 |
| 6,371,081 B1 | 4/2002 | Hawkins et al. | |
| 6,944,532 B2 | 9/2005 | Bellinger | |
| 6,957,139 B2 | 10/2005 | Bellinger | |
| 7,058,502 B2 | 6/2006 | Rodgers | |
| 7,524,265 B2 * | 4/2009 | Scelers | 477/110 |
| 2011/0093173 A1 | 4/2011 | Ideshio et al. | |

* cited by examiner

*Primary Examiner* — Hai Huynh
(74) *Attorney, Agent, or Firm* — Foley & Lardner LLP

(57) ABSTRACT

According to one embodiment, an apparatus for controlling operation of an internal combustion engine includes a conditions module that is configured to determine an out-of-gear condition of the internal combustion engine. The apparatus also includes a permission module that is configured to allow a speed of the internal combustion engine to exceed a maximum engine speed limit if the determined out-of-gear condition meets a threshold, and prevent the speed of the internal combustion engine from exceeding the maximum engine speed limit if the determined out-of-gear condition does not meet the threshold.

20 Claims, 4 Drawing Sheets

ENGINE SPEED CONTROL

FIELD

This disclosure relates to the operation of an internal combustion engine, and more particularly to controlling the speed of an internal combustion engine.

BACKGROUND

The improvement of fuel efficiency or engine brake performance of an internal combustion engine is a primary concern of engine manufacturers, end users, and regulatory agencies. Many attempts have been aimed at improving the fuel efficiency of internal combustion engines. However, in many instances, such improvements to the fuel efficiency of an engine often come at the expense of one or more other performance characteristics of the engine. In other words, measures to improve the fuel efficiency of an internal combustion engine may place various operational and performance limitations on the engines.

Generally, the amount of fuel consumed by an engine, which is directly related to the fuel efficiency of the engine, is determined based on one or more predetermined control surfaces. Each control surface includes precalibrated values for the fuel injection and air handling systems for various engine speed and engine load combinations within the operating range of the engine. The operating range of the engine is also predetermined and is typically referred to as a torque-speed curve. The torque-speed curve constrains operation of the engine to a range of engine speed and engine load combinations. For example, the torque-speed curve may limit the maximum engine speed or load to improve fuel efficiency, among other reasons. Notwithstanding the potential improvements to the fuel efficiency of the engine by instituting speed and load limitations on the engine, other performance characteristics and/or operations may suffer or be correspondingly limited.

SUMMARY

The subject matter of the present application has been developed in response to the present state of the art, and in particular, in response to the problems and needs in the art that have not yet been fully solved by currently available controllers or control strategies for internal combustion engines. Accordingly, the subject matter of the present application has been developed to provide a controller or control strategy that overcomes at least some shortcomings of the prior art. More specifically, disclosed herein is an improved control strategy for an internal combustion engine that facilitates improvements in fuel efficiency while allowing an expanded engine high speed range for certain limited applications, such as, for example, to provide speed synchronizations with a transmission for downshift events, particularly during downhill maneuvers. Such high engine speed during braking events can be utilized to provide improved engine braking performance.

According to one embodiment, an apparatus for controlling operation of an internal combustion engine includes a conditions module that is configured to determine an out-of-gear condition of the internal combustion engine. The apparatus also includes a permission module that is configured to allow a speed of the internal combustion engine to exceed a governed engine speed if the determined out-of-gear condition is satisfied (e.g., meets a threshold), and prevent the speed of the internal combustion engine from exceeding the governed engine speed limit if the determined out-of-gear condition is not satisfied (e.g., does not meet the threshold).

In some implementations, the conditions module determines the out-of-gear condition based on engagement of a transmission clutch. According to yet some implementations, the conditions module determines the out-of-gear condition based on a difference between the speed of the internal combustion engine and a speed of a transmission input shaft. Alternatively, the conditions module determines the out-of-gear condition based on a discrepancy between an expected engine output and transmission output shaft speed ratio and a detected engine output and transmission output shaft speed ratio. In yet certain implementations, the conditions module determines the out-of-gear condition based on an electronic signal from an automated transmission controller.

According to some implementations of the apparatus, the permission module is further configured to allow the speed of the internal combustion engine to exceed the governed engine speed if the speed of the engine is above a downshift speed limit, and to prevent the speed of the internal combustion engine from exceeding the governed engine speed if the speed of the engine is below the downshift speed limit. The downshift speed limit is less than the governed engine speed.

In certain implementations of the apparatus, the permission module is further configured to allow the speed of the internal combustion engine to exceed the governed engine speed if the engine is not operating above a minimum power threshold, and to prevent the speed of the internal combustion engine from exceeding the governed engine speed if the engine is operating above the minimum power threshold. The minimum power threshold can be equal to the power consumed by accessories powered by the engine.

According to another embodiment, an internal combustion engine system includes an internal combustion engine coupled to a transmission via a clutch. The engine system also includes an engine output shaft (e.g., crankshaft) and transmission input shaft that can be selectively coupled via the clutch. Additionally, the engine system includes a controller that has a predetermined torque-speed curve that defines a first operating region for engine speeds below a governed engine speed and a second operating region for engine speeds above the governed engine speed. Fueling to achieve speed operation of the internal combustion engine within the second operating region is allowed only when the transmission input shaft is selectively decoupled from the engine output shaft. Once synchronization with the transmission has occurred, the engine may transition into a coasting or braking mode where no fuel is consumed.

In some implementations, the engine system also includes external accessories that are powered by the internal combustion engine. Operation of the internal combustion engine within the second operating region is allowed only when the transmission input shaft is selectively decoupled from the engine output shaft and when power generated by the internal combustion engine is not more than the power received by the external accessories from the internal combustion engine.

According to some implementations, operation of the internal combustion engine within the second operating region is allowed only when the transmission input shaft is selectively decoupled from the engine output shaft during a downshift event. The second operating region may include an upper engine speed limit that is equal to a maximum speed required to downshift out of a top gear when the internal combustion engine is operating at the governed engine speed.

In yet another embodiment, a method for controlling operation of an internal combustion engine system includes determining whether the internal combustion engine system is out-of-gear, providing an engine operation map comprising a high speed region, allowing access to the high speed region when the internal combustion system is out-of-gear, and preventing access to the high speed region when the internal combustion system is not out-of-gear.

According to some implementations, the method further includes determining an engine speed of the internal combustion engine system, allowing access to the high speed region when the engine speed of the internal combustion engine system is greater than a maximum downshift speed, and preventing access to the high speed region when the engine speed of the internal combustion engine system is less than the maximum downshift speed. In yet some implementations, the method includes determining a power output of the internal combustion engine system, allowing access to the high speed region when the power output of the internal combustion engine system is not greater than an external accessory power consumption, and preventing access to the high speed region when the power output of the internal combustion engine system is more than the external accessory power consumption.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
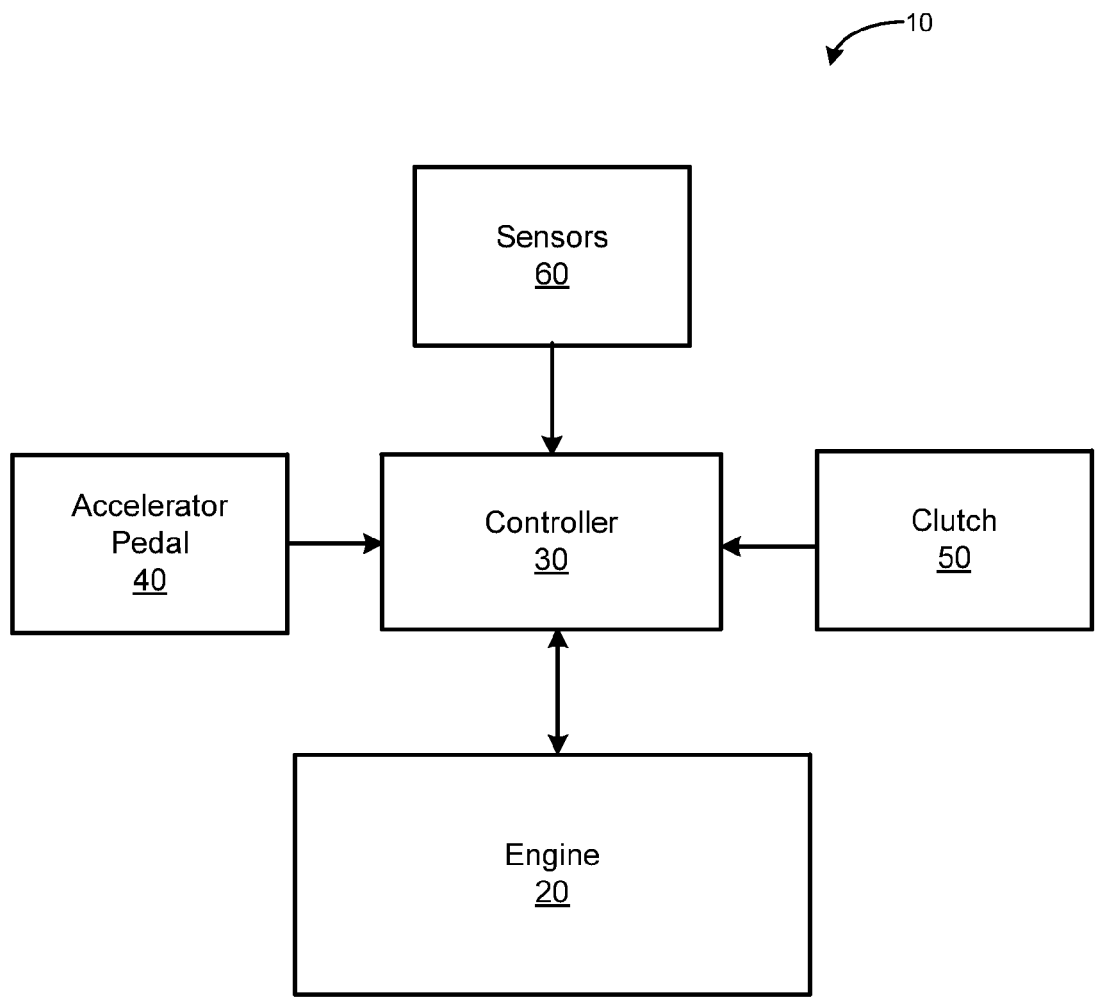
FIG. 1 is a schematic block diagram of an engine system having an internal combustion engine and a controller in accordance with one representative embodiment.

According to one embodiment depicted in FIG. 1, an internal combustion engine system 10 includes an internal combustion engine 20 powered by a fuel. Although not shown, the engine system 10 may be placed within or form part of a vehicle and be configured to operate and propel the vehicle. The engine 20 may be a diesel-powered engine, a gasoline-powered engine, alternate-fuel-powered engine, or hybrid. The engine 20 generates power by combusting a fuel and air mixture within combustion chambers housed by the engine. The combustion of the mixture drives linearly-actuated or rotary-type pistons. The linear or rotational motion of the pistons rotates an engine output shaft that transfers power to a drivetrain (e.g., transmission) of a vehicle to move the vehicle. The amount of power generated by the engine 20 is largely dependent upon the quantity and timing of fuel added or injected into the combustion chambers. For example, the more fuel added to and combusted in the combustion chambers, generally the higher the power generated and fuel consumed by the engine. The quantity and timing of fuel added to the combustion chambers is dependent upon a variety of operating conditions, such as engine speed, engine load (e.g., demand), vehicle speed, air intake characteristics, pressure, and temperature.

Generally, fuel injection quantity and timing values are obtained from at least one predetermined control surface that relates fuel injection quantity and timing values to engine operating conditions. For example, in one basic implementation, the control surface specifies fuel injection quantity and timing values as a function of engine speed and engine load demand values. Accordingly, in such an implementation, the fuel quantity to be added to the combustion chambers is the fuel quantity value corresponding to the current engine speed and desired or required engine load. In other implementations, in addition to the engine speed and engine load values, the control surface also accounts for one or more additional current operating condition values, such as vehicle speed, current air intake characteristics (e.g., air intake mass flow, intake mass concentration, etc.), current pressure (e.g., air intake pressure, ambient air pressure, exhaust pressure, etc.), and current temperature (e.g., air intake temperature, ambient air temperature, exhaust temperature, etc.). Accordingly, in such other implementations, the fuel quantity to be added to the combustion chambers is the fuel quantity value corresponding with the current engine speed and desired engine load, and the one or more additional operating condition values at the current engine speed and desired engine load.

The control surface or surfaces for an internal combustion engine of a vehicle are typically stored in the vehicle's electronic control module (ECM) or controller. In the illustrated embodiment, the controller 30 of the system 10 stores at least one control surface (see, e.g., FIG. 3). The controller 30 communicates with and/or receives communication from various components of the system 10, including the engine 20, an accelerator pedal 40, a clutch 50, one or more virtual or physical sensors 60, and other possible components, such as on-board diagnostic systems. Generally, the controller 30 controls the operation of the engine system 10 and associated sub-systems, such as the engine 20. The controller 30 is depicted in FIG. 1 as a single physical unit, but can include two or more physically separated units or components in some embodiments if desired.

In certain embodiments, the controller 30 receives multiple inputs, processes the inputs, and transmits multiple outputs. The multiple inputs may include sensed measurements from the sensors and various user inputs. In one implementation, the inputs include engine speed, desired engine load, vehicle speed, intake air characteristics, air and exhaust pressure, air and exhaust temperatures, and the like. The inputs are processed by the controller 30 using various algorithms, stored data, and other inputs to update the stored data and/or generate output values. The generated output values and/or commands are transmitted to other components of the controller and/or to one or more elements of the engine system 10 to control the system to achieve desired results, and more specifically, achieve desired fuel consumption characteristics.

Figure 2:
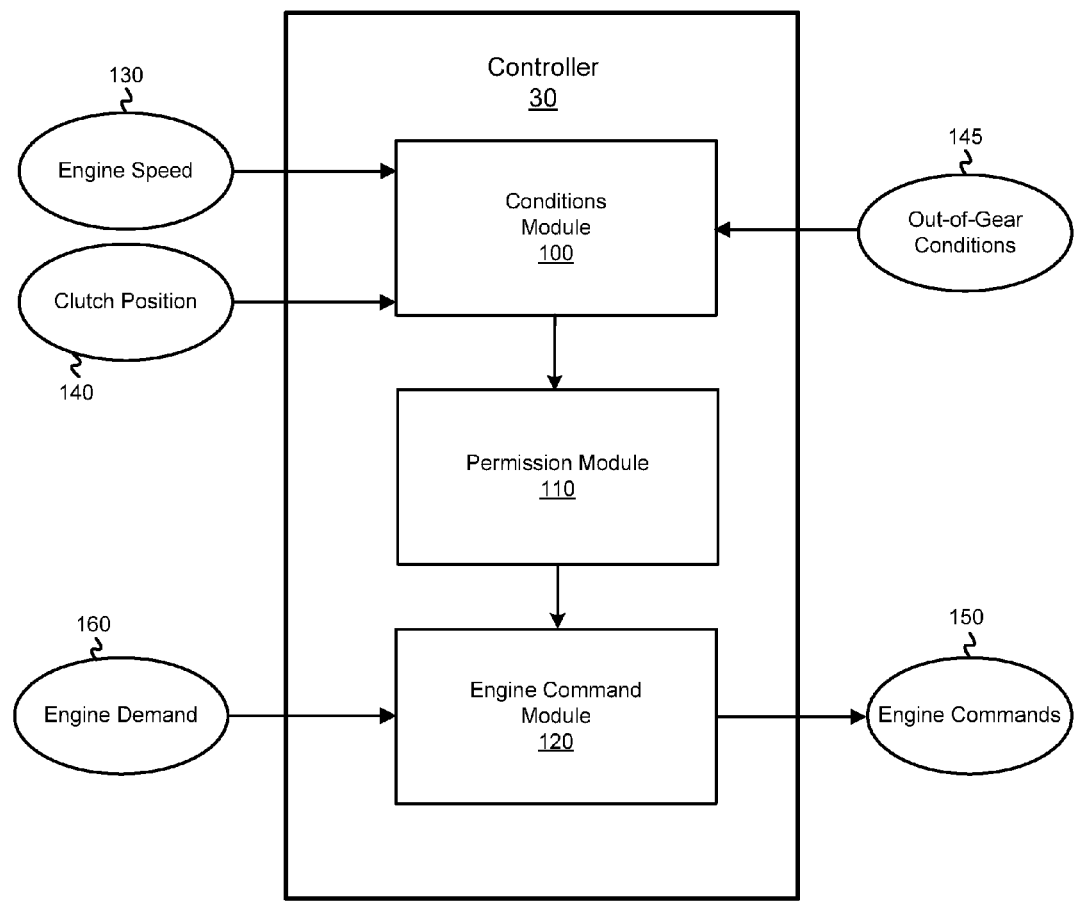
FIG. 2 is a schematic block diagram of the controller of FIG. 1 in accordance with one representative embodiment.
Figure 3:
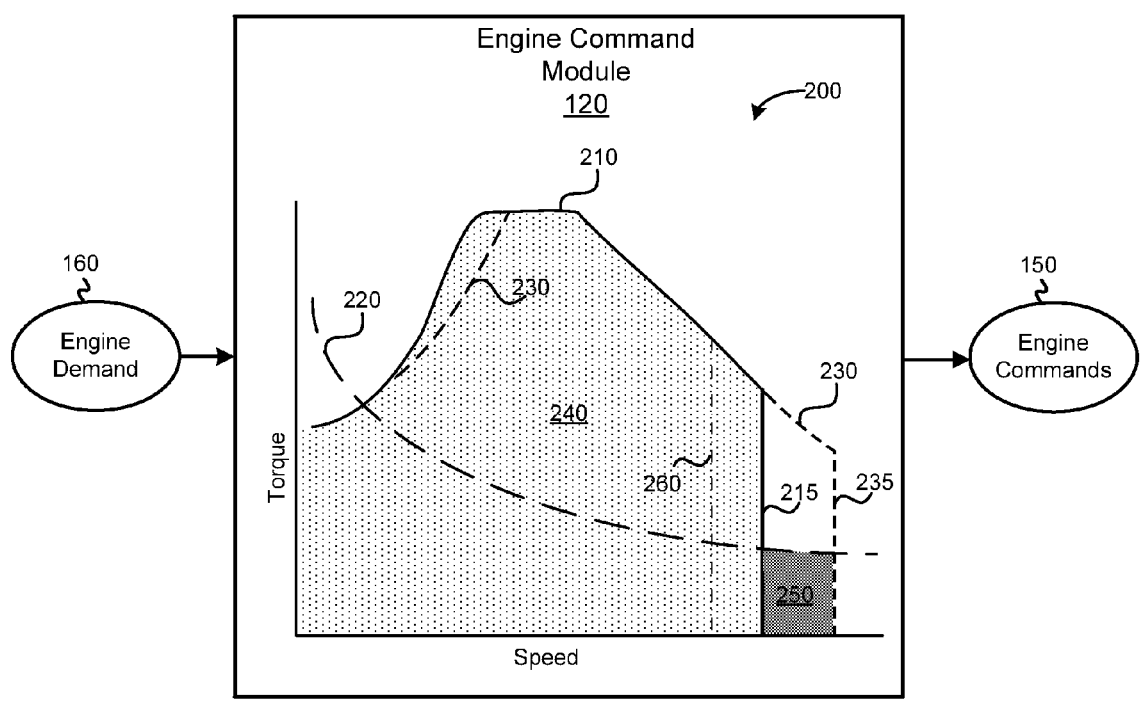
FIG. 3 is a schematic block diagram of an engine command module of the controller of FIG. 2 in accordance with one representative embodiment.

The controller 30 includes various modules and stores information for controlling the operation of the engine system 10. For example, as shown in FIGS. 2 and 3, the controller 30 includes a conditions module 100, a permission module 110, and an engine command module 120. Additionally, the controller 30 includes a torque-speed curve and associated control surface or surfaces 200 that form part of the engine command module 120. Generally, the modules 100, 110, 120 and torque-speed curve and control surfaces 200 of the controller 30 cooperate to generate one or more engine commands 150 requesting one or more operating conditions of the engine, such as those associated with the fuel efficiency of the engine system 10 (e.g., quantity of fuel to be injected, timing of the fuel injection, etc.).

The accelerator pedal 40 of the engine system 10 receives throttle input from a driver of the vehicle in which the engine system is housed, and communicates the throttle input to the controller 30 via an engine torque demand 160. The throttle input is received from the driver via the driver's positioning of the accelerator pedal 40, which can be a foot pedal, hand pedal, or other type of acceleration input device. In some implementations, such as during certain operating modes, the desired engine load is at least partially based on the throttle input. However, in other operating modes, such as during activation of cruise control, the desired engine load is determined independently of the throttle input.

For unthrottled engines, such as traditional diesel engines, the position of the accelerator pedal 40 of the vehicle may be proportional to the fuel quantity injected into the engine, as well as the operation of one or more actuators that indirectly influence the amount of fresh air being introduced into the engine. In certain implementations, the driver-controlled position of the accelerator pedal 40 is utilized by the controller 30 to generate the engine command 150 for the engine 20.

The clutch 50 is a transmission clutch that is selectively used to decouple an engine output shaft (e.g., crankshaft) from a transmission input shaft of a transmission system (not shown). Generally, the clutch 50 is actuated to disengage the transmission input shaft from the engine output shaft. Therefore, when the clutch 50 is not actuated, the engine output shaft and transmission input shaft are engaged. Accordingly, the clutch 50 is selectively operable between a disengaged configuration in which the clutch allows rotational engagement between the engine output shaft and transmission input shaft, and an engaged configuration in which the clutch rotationally disengages (e.g., physically separates) the engine output shaft and the transmission input shaft. Rotational engagement between the engine output shaft and transmission input shaft means the transmission input shaft co-rotates with (e.g., is rotated by) the engine output shaft. Rotational disengagement between the engine output shaft and transmission input shaft means the transmission input shaft rotates independent of the engine output shaft. In other words, when rotationally disengaged from the engine output shaft, the transmission input shaft slips relative to the engine output shaft. The transmission can be a manual transmission such that the clutch 50 is manually operated by an operator of the vehicle. In contrast, the transmission can be an automated transmission such that the clutch is automatically operated pursuant to a gear ratio adjustment scheme. In some implementations, an engine system 10 is equipped to selectively switch between manually-operated and automatically-operated modes.

An out-of-gear condition is created when the clutch 50 is operating in the actuated condition. In other words, the engine system 10 is considered to be out-of-gear when the engine output shaft and the transmission input shaft are decoupled. Accordingly, the engine system 10 can be placed into the out-of-gear position by operating the clutch 50 in the actuated condition. For example, in the case of a manually-operated transmission, the engine system 10 can be operated out-of-gear by actuating a manually-operated clutch pedal, paddle, button, shifter, or other actuation device. Likewise, for a manually-operated transmission, the engine system 10 can be operated in-gear by releasing or deactivating the manually-operated clutch. For automated transmissions, in some embodiments, the engine system 10 is automatically operated in the out-of-gear condition by electronically actuating a clutch during preprogrammed transitions from one gear ratio to another gear ratio.

Alternatively, the transmission input shaft and engine output shaft can be decoupled without the use of the clutch pedal or without a control module of an automatic or automated manual transmission actuating the clutch during an operation known commonly as float shifting. Float shifting is executed by the vehicle operator or control module (in the case of an automated shifting transmission) by taking the transmission out of gear during a no-load event (e.g., as the torque being generated by the engine passes from positive to negative, or negative to positive). During a no-load event, the lack of load on the transmission gears enables a shift out of gear with very low force on the shifting mechanism.

The sensors 60 include one or more sensing devices configured to sense (e.g., detect, measure, etc.) at least one operating condition and report the sensed operating condition to the controller 30. In some embodiments, the sensors 60 include one or more of intake air mass flow sensors, pressure sensors, temperature sensors, engine speed sensors, vehicle speed sensors, exhaust mass concentration sensors, clutch position sensor, out-of-gear conditions sensors, and the like. For example, in one illustrated implementation, one or more of the sensors 60 is an engine speed sensor that reports a sensed engine speed 130 to the controller 30. Moreover, in one illustrated implementation, one or more of the sensors 60 is a clutch position sensor that reports a sensed clutch position 140 or configuration to the controller 30. Alternatively, or additionally, the sensors 60 can be out-of-gear condition sensors that report various sensed out-of-gear conditions 145 to the controller 30. The sensors 60 can include physical sensors and/or virtual sensors. Moreover, the sensors 60 can include any of various other sensors for detecting operating conditions that may be indirectly associated with the engine speed and out-of-gear condition, but from which a determination of the engine speed and out-of-gear condition can be obtained.

The conditions module 100 of the controller 30 is configured to receive sensed operating conditions of the system 10, convert the sensed operating conditions into useable operating condition data if necessary, and forward the operating condition data to the permission module 110. In the illustrated embodiment, the conditions module 100 receives a current engine speed 130 and clutch position 140 from corresponding sensors 60. The conditions module 100 transmits the current engine speed 130 directly to the permission module 110. However, the conditions module 100 may convert the sensed clutch position 140 into one of an in-gear or out-of-gear condition. For example, if the sensed clutch position 140 is deactivated as described above, then the conditions module 100 transmits operating condition data indicating an in-gear condition of the system to the permission module 110. However, if the sensed clutch position 140 is actuated as described above, then the conditions module 100 transmits operating condition data indicating an out-of-gear condition of the system to the permission module 110.

In some implementations, the conditions module 100 receives any of various out-of-gear conditions 145 from one or more corresponding out-of-gear sensors. In one implementation, the out-of-gear sensors may include a transmission input shaft speed sensor configured to detect the speed of the transmission input shaft. In such an implementation, the conditions module 100 compares the detected engine speed 130 (e.g., the speed of the engine output shaft) with the detected transmission input shaft. The conditions module 100 is configured to transmit operating condition data indicating an in-gear condition if the engine output shaft speed is the same as the transmission input shaft speed. Alternatively, the conditions module 100 transmits operating data indicating an out-of-gear condition if the detected engine output shaft speed and transmission input shaft speed are different.

According to another implementation, the out-of-gear sensors may include a transmission output shaft (e.g., tail shaft) speed sensor configured to detect the speed of the transmission output shaft. The conditions module 100 compares the detected engine speed 130, or engine output shaft speed, and the detected transmission output shaft speed to determine a transmission gear ratio. In some implementations, the transmission output shaft speed can be determined based on a vehicle's speed, fixed rear axle ratio, and tire diameter. The transmission gear ratio is the ratio of the engine output shaft speed to the transmission output shaft speed. The conditions module 100 then compares the determined or actual transmission gear ratio to an expected or predetermined transmission gear ratio for in-gear conditions. The expected transmission gear ratio is a known or predetermined value based on the selected transmission gear. Basically, the engine output shaft and transmission output shaft will rotate at one of several discrete transmission gear ratios relative to each other whenever the transmission is in gear and the clutch is not activated. If the actual transmission gear ratio is different than the expected transmission gear ratio, then the conditions module 100 is configured to transmit operating condition data indicating an out-of-gear condition (e.g., because clutch is activated or transmission is in neutral). In contrast, if the actual transmission gear ratio is approximately the same as the expected transmission gear ratio, then the conditions module 100 is configured to transmit operating condition data indicating an in-gear condition.

The permission module 110 compares the operating condition data received from the conditions module 100 to predetermined threshold conditions. Based on the comparison, the permission module 110 determines whether access to a high engine speed region 250 of a torque-speed curve and associated control surface 200 is allowed (see, e.g., FIG. 3).

In embodiments that facilitate high speed downshifting events, the permission module 110 compares the current engine speed 130 to a maximum downshift speed or downshift speed limit 260 (see, e.g., FIG. 3). The maximum downshift speed 260 is defined as the maximum engine speed that a downshift out of top gear can occur. More specifically, the maximum downshift speed 260 is set to prevent a downshift at engine speeds above the maximum downshift speed. If the current engine speed 130 is above the maximum downshift speed 260, then the permission module 110 may make a high engine speed region accessible for a downshift event. Otherwise, the permission module 110 denies access to the high engine speed region if the speed 130 is below the maximum downshift speed.

The maximum downshift speed 260 is dependent upon the governed speed of the engine. Basically, the governed engine speed is the maximum engine speed at which full torque can be achieved. For purposes of this disclosure, full torque is defined as any torque above the torque required to accommodate accessory loads placed on the engine. As shown in FIG. 3, the governed engine speed can be defined as the engine speed at which the torque-speed curve 210 intersects an accessory power curve 220. The accessory power curve 220 represents the constant power consumed by accessories powered by the engine during normal operation. The accessories can include any of various accessories commonly used in the art, such as a cooling fan, air pump, air compressor, alternator, air-conditioning pump, and the like. In one implementation, the constant power of the power curve 220 is about 170 HP for "fan-on" operation. However, the constant power of the curve 220 can vary based on engine configuration type and the power consumption levels of the accessories. Accordingly, the maximum governed speed can vary during operation of the engine based on variations in the constant power curve 220. Generally, the engine is operating under a no-load operating condition when the load generated by the engine is not more than the engine load associated with the power curve 220.

Generally, beyond the governed engine speed, the torque output of the engine rapidly decreases. For example, for an isochronous governor, the torque immediately drops to zero after the governed engine speed, and for droop type governors, the torque rapidly drops to zero after the governed engine speed. As shown in FIG. 3, for isochronous torque-speed curves (see, e.g., torque-speed curve 210), the governed engine speed is the speed associated with immediate drop of the torque-speed curve 210, which is defined as the maximum full-load speed portion 215 of the curve 210 (see, e.g., FIG. 3). Although an engine may be physically capable of achieving engine speeds above the governed engine speed, the controller 30, and more specifically, the torque-speed curve and associated control surface 200, limits the maximum engine speed at which full torque is achieved to the governed engine speed.

The governed speed of the engine, which is dependent on the torque-speed curve as discussed above, can be set based on various factors. In some implementations, one factor affecting the governed engine speed is the desired fuel efficiency or engine brake performance of the engine. Generally, operating an engine at higher engine speeds tends to degrade the fuel efficiency of an engine. Correspondingly, operating the engine at lower or medium engine speeds tends to improve the fuel efficiency of the engine. Accordingly, reducing the governed engine speed can result in an overall improvement in the fuel efficiency of an engine by preventing operation of the engine at fuel-efficiency-reducing higher speeds. In one specific implementation, the governed engine speed is reduced from a higher governed engine speed, which is associated with the maximum full-load speed portion 235 (e.g., 2,100 RPM), to the lower governed engine speed, which is associated with the maximum full-load speed portion 215 (e.g., 1,800 RPM). The reduction of the governed engine speed results in an improvement in the fuel efficiency of the engine.

However, one consequence of reducing the governed engine speed is a corresponding reduction in downshift capability. In other words, reducing the governed engine speed limits the engine speed range in which a downshift event can occur. Basically, if the engine speed change associated with a desired transmission gear ratio change would result in an engine speed above the governed engine speed, a downshift even cannot be successfully executed.

Access to engine speeds above the governed engine speed during a "no-load" out-of-gear condition does not substantially negatively affect the fuel efficiency of the engine. Accordingly, granting permission to access an operating region (e.g., high engine speed operating region 250) with engine speeds above the governed engine speed allows greater range for executing downshift events while preserving the fuel efficiency benefits associated with reducing the governed engine speed.

In the illustrated embodiment, the permission module 110 grants or denies access to the high engine speed region based on whether the engine system 10 is operating in an out-of-gear condition as determined by the conditions module 100. The permission module 110 may grant permission to access the high engine speed operating region 250 when the out-of-gear condition is met. However, the permission module 110 denies permission to access the high engine speed operating region 250 when the out-of-gear condition is not met (i.e., the engine system 10 is operating in an in-gear condition).

The granting or denial of permission to the high engine speed region 250 by the permission module 110 is communicated to the engine command module 120. As shown in FIG. 3, the engine command module 120 includes a combined torque-speed curve and associated control surface 200. As used herein, a torque-speed curve defines the electronically imposed engine speed and torque limits that are calibrated into the controller 30. The torque-speed curve is independent of any engine operation commands (e.g., fuel injection, air handling, etc.). Essentially, the torque-speed curve limits the quantity of fuel that can be injected into an engine as a function of engine speed. In contrast, a control surface, as used herein, is where specific engine operation commands are stored. Although other operation commands are possible (e.g., fresh air flow, actuator positions, etc.), in some embodiments, the control surface contains multiple fuel pulse quantity and timing commands, in addition to charge flow and EGR fraction commands. In certain implementations, multiple control surfaces with pre-calibrated engine operation commands may be used based any number of inputs to the controller 30. Although occupying different parts of fuel efficiency calibration, the torque-speed curve (by virtue of torque limiting) and the control surface(s) (by virtue of combustion and pumping efficiency) impact fuel efficiency.

The torque-speed curve and associated control surface 200 includes a standard operating region 240 defined under the torque-speed curve 210, which includes the maximum full-load speed portion 215 that defines the governed engine speed. Further, the torque-speed curve and associated control surface 200 includes the high engine speed operating region 250 defined between the maximum full-load speed portion 215 of the torque-speed curve 210, the maximum full-load speed portion 235 associated with a conventional torque-speed curve 230 (which has a higher governed engine speed and higher intermediate engine speeds for the same torque values), and the power curve 220. Because the maximum torque or power of the engine 20 allowed during operation within the high engine speed operating region 250 is limited to the power curve 220, which corresponds with the minimum power necessary to operate accessories powered by the engine, not only is improved fuel efficiency maintained, but a disincentive to tamper with or override the controller 30 to extract additional fuel and power is created.

The torque-speed curve and associated control surface 200 includes predetermined fuel quantities (and/or fuel injection timing parameters, air handling parameters, EGR parameters, or other operating parameters) for various torque-speed combinations within the standard operating region 240 and high engine speed operating region 250. Generally, the predetermined fuel quantities, and/or other predetermined parameter values populating the torque-speed curve and associated control surface 200 are selected to produce a desired fuel economy in view of other considerations, such as performance, power, operator inputs, etc.

The engine command module 120 receives one or more engine torque demands 160, such as a throttle input, accessory power demands, and the like, and the current engine speed 130. The engine torque demands 160 and engine speed 130 are compared against the torque-speed curve and associated control surface 200 to determine the desired operating parameters (e.g., fuel quantity) for achieving the engine torque demands at the given engine speed. The engine command module 120 then generates one or more engine commands 150 (e.g., fuel injection commands) for achieving the desired operating parameters.

The engine command module 120 also receives the permission status of the high engine speed region 250 from the permission module 110. Based on the permission status, the engine command module 120 either allows access to the high engine speed operating region 250 or disallows access to the high engine speed operating region. For example, if the permission module 110 grants access to the high engine speed operating region 250, the engine system 10 may perform a downshift event that requires the speed of the engine to be increased above the governed engine speed. In one implementation, following the downshift event, the speed of the engine may remain above the governed engine speed. However, no additional fueling above the amount of fuel necessary for meeting the constant power associated with the power curve 220 is allowed until the speed of the engine is reduced to the governed engine speed or lower. Because no additional fueling is allowed during operation in the high engine speed operation region 250, the increase in engine speed associated with operation in the high engine speed region does not negatively impact the fuel efficiency of the engine system 10.

Figure 4:
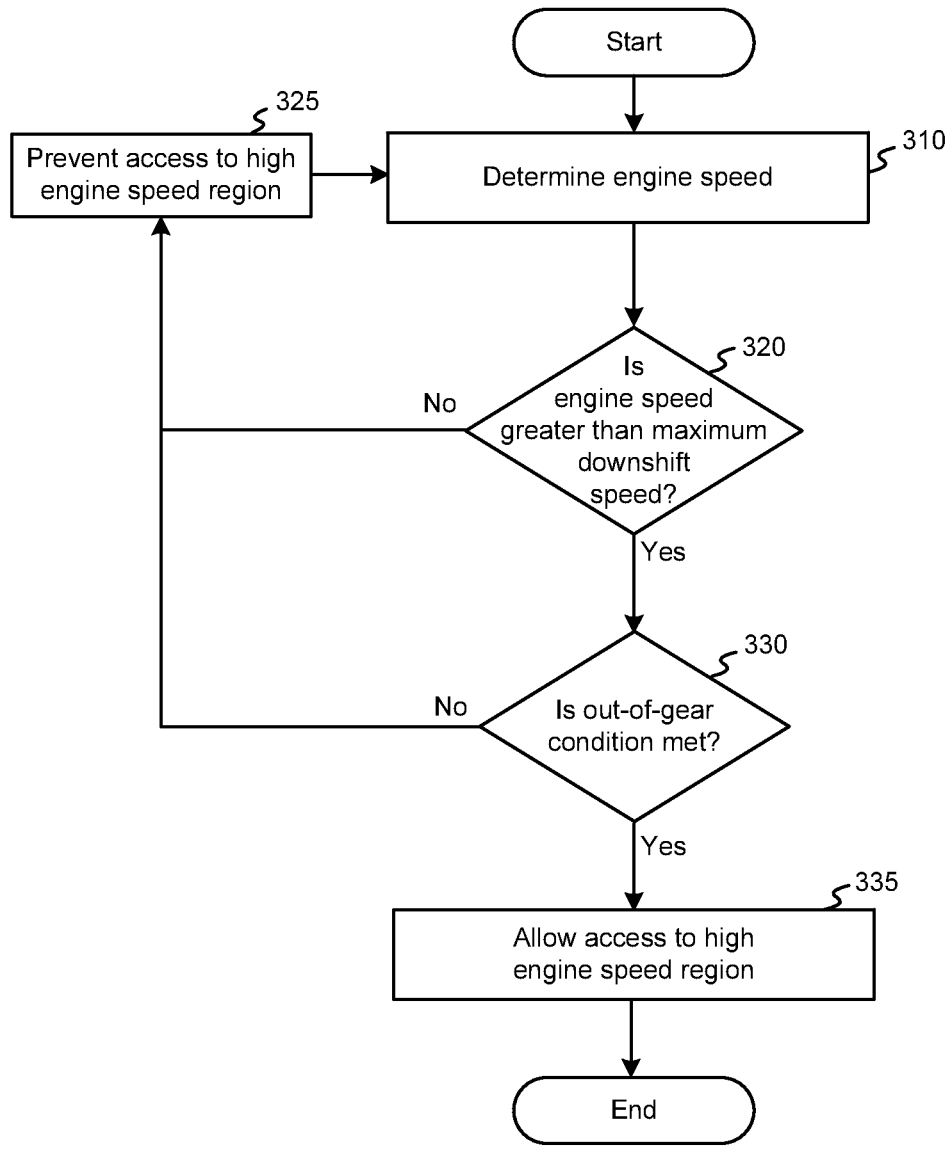
FIG. 4 is a schematic flow chart diagram of one embodiment of a method for controlling the operation of an engine system.

Referring to FIG. 4, one embodiment of a method 300 for controlling operation of the engine 20 may be executed by the one or more of the modules described above. According to one implementation, the method 300 begins by determining the speed of the engine 20 at 310. The method 300 then determines whether the engine speed is less than a maximum downshift speed at 320. If the engine speed is less than the maximum downshift speed, then the method 300 prevents access to a high engine speed operating region (e.g., region 250) and again determines the engine speed at 310. However, if the engine speed is more than the maximum downshift speed, then the method 300 proceeds to determine if an outof-gear condition has been met at 330. In other implementations of the method 300, the steps 310, 320 are not performed, and the method proceeds directly to step 330 after starting.

If the out-of-gear condition has been met (e.g., the clutch 50 is engaged, relative rotation between engine output shaft and transmission input shaft is detected, the engine operating load is not greater than the load associated with the accessory power curve 220 (e.g., float shifting event occurring), and/or other operation conditions are present), then the method 300 allows access to a high engine speed operating region at 335 and the method ends. But, if the out-of-gear condition has not been met or an in-gear condition is met (e.g., the clutch 50 is not engaged, co-rotation between engine output shaft and transmission input shaft is detected, and/or other operation conditions are present), then the method 300 prevents access to a high engine speed operating region and again determines the engine speed at 310.

In addition to allowing limited access to high engine speeds for downshift events and improving the fuel efficiency of the engine system 10, reducing the governed engine speed also facilitates the use of more efficient turbochargers with the system. Because the engine speeds associated with standard operation of the engine system 10 are lower compared to conventional systems, more efficient turbochargers configured for operation at lower speeds can be utilized with less fear of negative side effects (e.g., turbo choke) associated with high engine speeds.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus for controlling operation of an internal combustion engine, comprising:
    a conditions module configured to determine an out-of-gear condition of the internal combustion engine; and
    a permission module configured to allow a speed of the internal combustion engine to exceed a maximum engine speed limit if the determined out-of-gear condition meets a threshold, and prevent the speed of the internal combustion engine from exceeding the maximum engine speed limit if the determined out-of-gear condition does not meet the threshold.

2. The apparatus of claim 1, wherein the conditions module determines the out-of-gear condition based on actuation of a transmission clutch.

3. The apparatus of claim 1, wherein the conditions module determines the out-of-gear condition based on a difference between the speed of the internal combustion engine and a speed of a transmission input shaft.

4. The apparatus of claim 1, wherein the conditions module determines the out-of-gear condition based on a difference between an expected engine output and transmission output shaft speed ratio and a detected engine output and transmission output shaft speed ratio.

5. The apparatus of claim 1, wherein the conditions module determines the out-of-gear condition based on an electronic signal from an automated transmission controller.

6. The apparatus of claim 1, wherein the permission module is further configured to allow the speed of the internal combustion engine to exceed the maximum engine speed limit if the speed of the engine is above a downshift speed limit, and to prevent the speed of the internal combustion engine from exceeding the maximum engine speed limit if the speed of the engine is below the downshift speed limit, wherein the downshift speed limit is less than the maximum engine speed limit.

7. The apparatus of claim 1, wherein the permission module is further configured to allow the speed of the internal combustion engine to exceed the maximum engine speed if the engine is not operating above a minimum power threshold, and to prevent the speed of the internal combustion engine from exceeding the maximum engine speed if the engine is operating above the minimum power threshold.

8. The apparatus of claim 7, wherein the minimum power threshold is equal to the power consumed by accessories powered by the engine.

9. The apparatus of claim 1, wherein the maximum engine speed is a maximum full-load speed.

10. The apparatus of claim 1, wherein the permission module allows access to the high speed region to accommodate an engine speed change associated with a desired downshift event that would result in the engine speed exceeding the maximum engine speed limit.

11. An internal combustion engine system, comprising:
    an internal combustion engine comprising an engine output shaft;
    a transmission clutch configured to selectively couple the engine output shaft to a transmission input shaft and decouple the engine output shaft from the transmission input shaft; and
    a controller comprising a predetermined torque-speed map defining a first operating region for engine speeds below a maximum engine speed and a second operating region for engine speeds above the maximum engine speed, wherein operation of the internal combustion engine within the second operating region is allowed only when the transmission input shaft is selectively decoupled from the engine output shaft.

12. The system of claim 11, further comprising external accessories in power receiving communication with the internal combustion engine, wherein operation of the internal combustion engine within the second operating region is allowed only when the transmission input shaft is selectively decoupled from the engine output shaft and when power generated by the internal combustion engine is not more than the power received by the external accessories from the internal combustion engine.

13. The system of claim 11, wherein operation of the internal combustion engine within the second operating region is allowed only when the transmission input shaft is selectively decoupled from the engine output shaft during a downshift event.

14. The system of claim 11, wherein the second operating region comprises an upper engine speed limit equal to an engine speed required to downshift out of a top gear when the internal combustion engine is operating at the maximum engine speed, the upper engine speed limit being greater than the maximum engine speed.

15. The system of claim 11, wherein the second operation region comprises a no-engine-load operating region.

16. A method for controlling operation of an internal combustion engine system, comprising:
    determining whether the internal combustion engine system is out-of-gear;
    providing an engine operation map comprising a high speed region;
    allowing access to the high speed region when the internal combustion system is out-of-gear; and
    preventing access to the high speed region when the internal combustion system is not out-of-gear.

17. The method of claim 16, further comprising determining an engine speed of the internal combustion engine system, allowing access to the high speed region when the engine speed of the internal combustion engine system is greater than a maximum downshift speed, and preventing access to the high speed region when the engine speed of the internal combustion engine system is less than the maximum downshift speed.

18. The method of claim 16, further comprising determining a power output of the internal combustion engine system, allowing access to the high speed region when the power output of the internal combustion engine system is not greater than an external accessory power consumption, and preventing access to the high speed region when the power output of the internal combustion engine system is more than the external accessory power consumption.

19. The method of claim 16, wherein the high speed region comprises engine speeds greater than a maximum governed speed limit of the engine.

20. The method of claim 16, wherein allowing access to the high speed region accommodates an engine speed change associated with a desired downshift event that would result in the engine speed exceeding a maximum governed speed limit of the engine.

* * * * *